Oct. 29, 1968 L. A. SHANAFELT ETAL 3,408,456

METHOD FOR PROVIDING HIGH DEFINITION COLORED TELEVISION IMAGE

Filed Oct. 23, 1965 3 Sheets-Sheet 1

INVENTOR.
LEO A. SHANAFELT
HAROLD W. BERGER
BY [signature]
ATTORNEY

INVENTOR.
LEO A. SHANAFELT
HAROLD W. BERGER
BY
ATTORNEY

METHOD FOR PROVIDING HIGH DEFINITION COLORED TELEVISION IMAGE

Filed Oct. 23, 1965 3 Sheets-Sheet 3

INVENTOR.

LEO A. SHANAFELT
HAROLD W. BERGER

BY

ATTORNEY 3,408,456

METHOD FOR PROVIDING HIGH DEFINITION COLORED TELEVISION IMAGE

Leo A. Shanafelt, 5823 Keokuk Ave., Woodland Hills, Calif. 91364, and Harold W. Berger, 4540 Alonzo Road, Encino, Calif. 91316

Filed Oct. 23, 1965, Ser. No. 503,925
2 Claims. (Cl. 178—5.4)

ABSTRACT OF THE DISCLOSURE

A three-color television image is provided by combining with two images on opposite sides of a thin plate in a thin-tube type tube, an image from a third tube which preferably is also of the thin-tube type.

This invention relates to a method for providing a colored television image of three or more colors and more particularly to a method for providing such an image which is a high definition image, which requires relatively little power and which is at the same time relatively parallax-free.

Heretofore, parallax-free images have been provided in standard "shadow-mask" picture tubes comprising three electron guns wherein the beams pass through a screen containing many very small apertures and impinge on a target screen which comprises three interspersed arrays of many small dots, each array being of different phosphor composition to emit a different color. The brightness of the image formed on such a target is limited by the apertured or shadow screen which cuts off much of the energy which would otherwise reach the target from each gun. Such tubes are also notoriously very difficult to align to cause each beam to impinge on all dots in the proper array to an optimum extent. Thus the desired brightness is not obtained or, as a corollary, the power needed to drive each beam to achieve a desired brightness level is relatively great.

In another method, desired brightnesses of colored television images comprising three or more colors have been obtained with lower power requiremnts but such images have had relatively great parallax.

In FIGURES 39, 40, 41, 42, 43 and 44 of Aiken, U.S. Patent 2,795,731, there are shown thin cathode ray tubes of the type to which this invention relates wherein the image provided is not altogether parallax-free. The problem of parallax is discussed in said patent in connection with FIGURE 42 wherein the parallax problem is illustrated. Although it is stated in said patent that, because the distance between the electron responsive surfaces therein may be relatively small, parallax may be "substantially" eliminated, it has been found that for certain purposes if not all purposes, it is extremely desirable to provide an image which is much more nearly free of parallax than is an image of the sort provided in FIGURES 39, 40, 41, 42, 43, and 44 of said patent.

In accordance with these figures, substantially two separate images in two spaced apart planes are obtained and when a viewer moves from a first position to a second after establishing registration of the images when viewed in the first position, parallax occurs and, in effect, registration of the images is destroyed. The resultant picture appears to become fuzzy and also "halated" with colored lines appearing at the principal outlines of persons and objects in the picture.

Accordingly, it is an object of the present invention to provide a three-color or four-color television image which has relatively high definition.

Another object is to provide such an image which has relatively little parallax and which requires relatively low power to produce.

Another object is to provide a three-color or four-color television tube which requires much less power than a "shadow-mask" tube to provide an image having the same brightness as an image produced in a shadow mask tube.

Another object is to provide such an image by utilization of a thin cathode ray tube of the Aiken type described in the aforementioned patent.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

Figure 1:
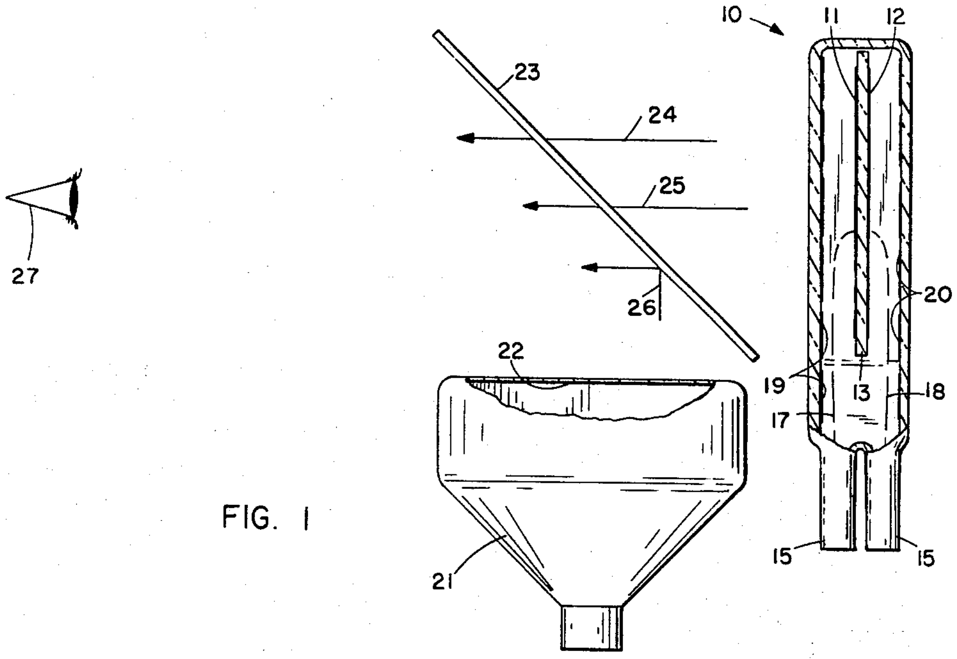
FIGURE 1 is a schematic partially cross-sectional elevation of one means for carrying out the method of the invention.

Referring now to FIGURE 1, there is provided a thin cathode ray tube of the type described in the aforementioned Aiken patent indicated generally as 10 which comprises flat planar target screens 11 and 12 coated on opposite sides of the transparent target plate 13. Target screen 11 through which the image on screen 12 must be viewed is preferably transparent or at least translucent. Each of screens 11 and 12 comprises a phosphor or other material which emits visible light when struck by an electron beam. The phosphors of 11 and 12 are preferably of such composition as to emit visible light of two different primary colors. Electron gun 16 is adapted to provide an electron beam travelling substantially parallel to and spaced apart from target 12 and gun 15 is adapted to provide such a beam substantially parallel to and spaced apart from target 11.

An array of vertical deflection elements 19 is disposed in a plane which is preferably parallel to target 11 to cause beam 17 produced by gun 15 to impinge on target 11 and an array 20 of vertical deflection elements is provided in a plane which is preferably parallel to target 12 to cause beam 18 produced by gun 15 to impinge on target 12. The vertical deflection elements of arrays 19 and 20 are preferably transparent conductive material coated on interior surfaces of the tube envelope and the elements on one side, the side through which the tube is viewed, must necessarily be transparent. Means is provided as disclosed in the prior art or otherwise to cause a suitable change in voltage to be imposed sequentially on each element of each array to provide for vertical sweep of the screen by the beam. Horizontal sweep may be provided by suitable elements adjacent the gun. For reason described hereinbelow the images produced respectively on screens 11 and 12 are relatively high definition images.

Plate 13 is made sufficiently thin so that there is preferably relatively little parallax between the images produced by flat planar targets 11 and 12.

A television tube 21 is provided which has a planar screen 22 which may be coated on any interior surface of a portion of the envelope as shown or may be coated on a separate planar plate contained within the envelope and at least partially spaced away from adjacent portions of the envelope. Tube 21 produces an image on its screen 22 which is disposed in a plane lying at an angle (which for example may be 90°) with respect to the plane of targets 11 and 12. Dichroic mirror 23 is provided at an angle (for example 45°) which bisects the angle between the planes of target 22 and plate 13 so that rays from targets 11 and 12, as indicated by arrows 24 and 25, pass directly therethrough and rays from screen 22 as indicated by the arrow 26 are reflected at an angle to travel from the mirror parallel to rays 24 and 25. The phosphor material or other light emitting material of screen 22 is chosen to emit light in a third color which is primary with respect to the colors emitted by the materials of screens 11 and 12, so that screens 22, 11 and 12 emit light in three different primary colors which, for example, may be red, blue and green. Rays from the three screens as indicated by arrows 24, 25 and 26 reach the eye 27 of the viewer, or a camera lens which may be substituted therefor, parallel to one another so that the images of screens 11, 12 and 22 are optically combined into an image comprising three colors. Since the image produced at each of screens 11, 12 and 22 is preferably substantially uninterrupted by interruptions in or on the material of the screen and preferably substantially uninterrupted by any means interposed between any gun and the screen with which it is associated, each of the images on screens 11, 12 and 22 has the full brightness which may be provided by delivery of a selected amount of power to the gun which produces the image. The combined image viewed by eye 27 (or camera substituted therefor) has a brightness equal to the sum of the brightnesses of said three images minus the loss of light due to passage through or reflection from glass. The total power required to produce the combined image is thus much less than required to produce a comparable image in a "shadow-mask" tube wherein a control plate located between the gun and the target screen receives a high proportion of the electrons emitted by the guns. High definition is provided by thus combining optically the two high definition images on the screens of the target plate with an image on a third screen, to provide an image in which all of the three images are effectively coincident in the same plate.

Figure 2:
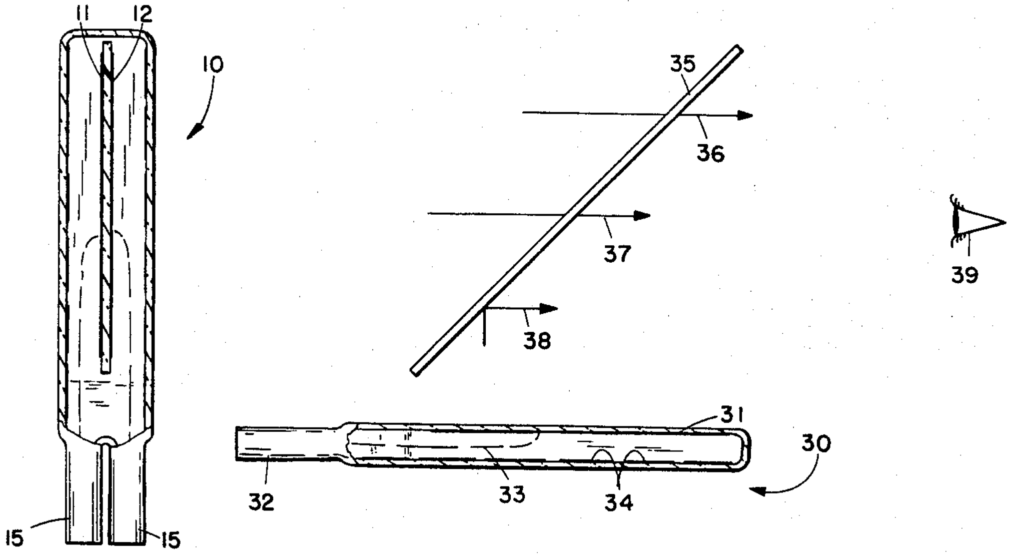
FIGURE 2 is a schematic partially cross-sectional elevation of one means for carrying out the method of the invention.

Referring now to FIGURE 2, there may be provided in conjunction with tube 10 and flat planar screens 11 and 12 (which produce images in two different primary colors) a second thin cathode ray tube 30 which may have flat planar screen 31; screen 31 may be of a suitable composition to provide an image in the corresponding third primary color. Tube 30 may comprise an electron gun 32 adapted to emit a beam 33 in a plane more or less parallel to target screen 31. An array of vertical deflection elements 34 may be provided lying in a plane substantially parallel to the plane of target screen 31 and spaced apart therefrom. Deflection elements 34 may be of any suitable conductive material and may be adapted to cause beam 33 to impinge on target 31 and to provide vertical sweep of beam 33 over screen 31 in a manner described in the prior art or otherwise. Horizontal sweep may be provided by elements adjacent the gun. The image thus produced on target 31 is a high definition image in that it has high definition in the vertical plane due to the focusing effect of the electrostatic field between the target screen and the array of vertical deflection elements. Target 31 is preferably disposed in a plane which lies at an angle (for example 90°) to the plane of targets 11 and 12. Between said planes there may be provided dichroic mirror 35 which may serve to optically combine the images from targets 11 and 12 indicated by rays 36 and 37 and the image from target 31 as indicated by rays 38 so that eye 39 of a viewer (or a camera which may be substituted therefore) views the combined image which is relatively parallax-free and is a high definition image because it is composed of a combination of high definition images. The image has a brightness equal to the sum of the brightnesses of the images provided on screens 11, 12 and 31 less normal glass reflection and refraction losses and requires less power to produce than does an image of corresponding brightness in a shadow-mask tube.

Figure 3:
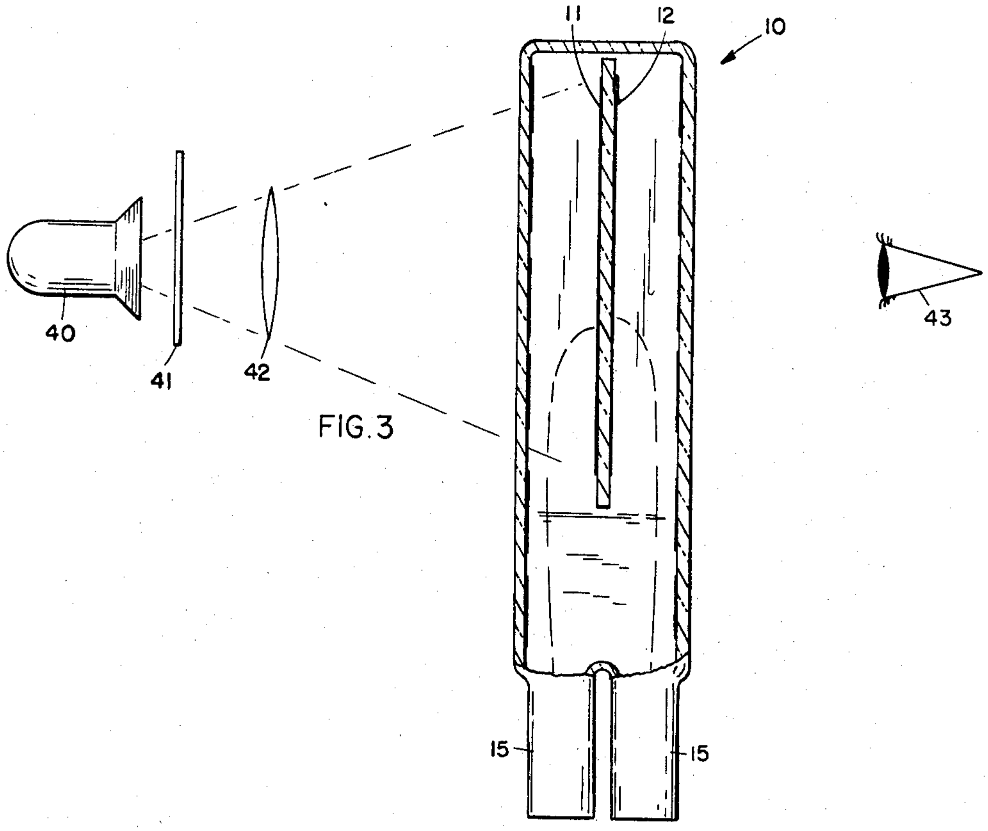
FIGURE 3 is a schematic partially cross-sectional elevation of one means for carrying out the method of the invention.

Referring now to FIGURE 3, an image in accordance with the invention may be provided by projecting onto screen 11 of tube 10 an image in the third primary color, which is not provided by the two different primary colored images of targets 11 and 12, from conventional cathode ray projection tube 40 through colored filter 41 and focusing lens 42. Colored filter 41 provides the desired color for the image projected by tube 40. In this embodiment both arrays must be transparent. Thus the image which may be viewed by eye 43 of an observer may be an optically combined real image at the plane of targets 11 and 12. The image thus produced has all of the characteristics and advantages described heretofore for other embodiments.

Figure 4:
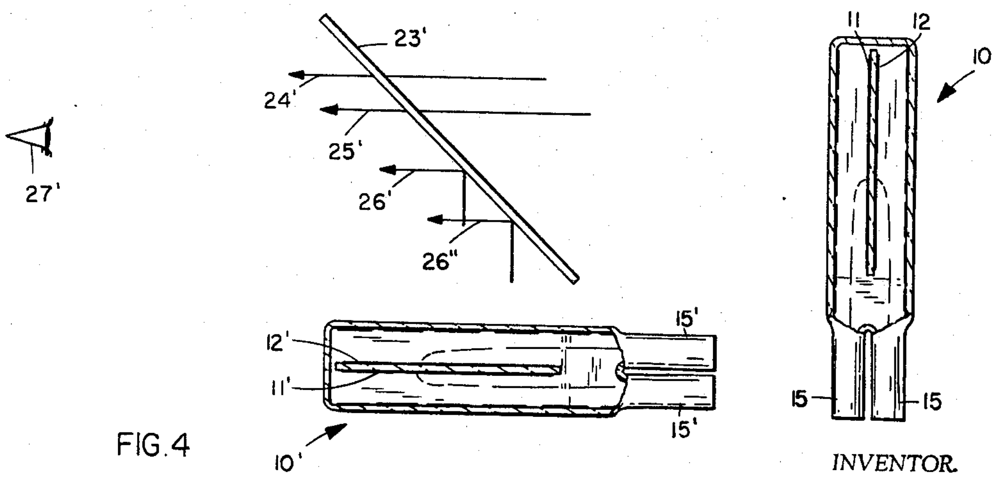
FIGURE 4 is a schematic partially cross-sectional elevation of one means for carrying out the method of the invention.

As shown in FIGURE 4, a four-color combined image in accordance with the invention may be provided by substituting for tube 21 in FIGURE 1 or tube 30 in FIGURE 2 a tube 10' which may be identical with tube 10, except for the material of which the target screens are made. Screens 11, 12, 11' and 12' may provide images respectively having four different colors and the combined image provided by dichroic mirror 23', as indicated by rays 24', 25', 26' and 26'' may have a brightness equal to the sum of the brightnesses of the images provided on screens 11, 12, 11' or 12', less usual losses. The combined image thus obtained has the characteristics and advantages described for other embodiments, i.e., it is a high definition image, relatively free from parallax, which requires much less power to produce than would an image of comparable brightness in a shadow-mask tube.

Figures 5, 6:
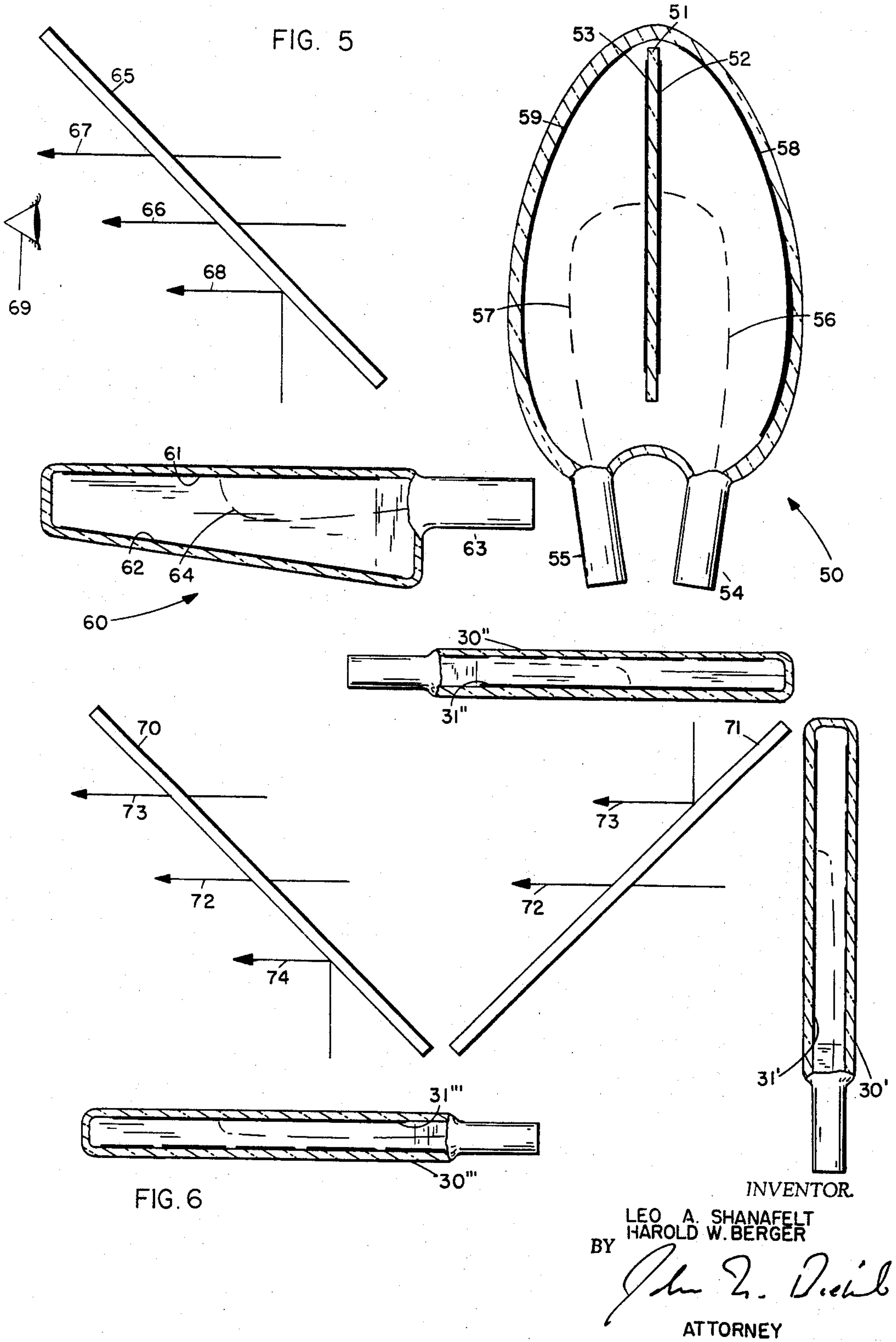
FIGURE 5 is a schematic partially cross-sectional elevation of one means for carrying out the method of the invention.
FIGURE 6 is a schematic partially cross-sectional elevation of one means for carrying out the method of the invention.

Referring now to FIGURE 5, there is shown an embodiment which corresponds to the embodiment of FIGURE 2 but wherein each array of vertical deflection elements is replaced with a single vertical deflection element and wherein vertical sweep of each target screen is provided by the combination of varying the voltage imposed on said element and varying the angle at which the beam is emitted from the gun; for each vertical sweep the angle of the beam with respect to the target screen and the deflection element is varied. As may be seen, the deflection elements are not necessarily parallel to the target screens. Thus, tube 50 comprises flat planar target screens 52 and 53 coated on opposite sides of thin transparent target plate 51. Target screen 52 through which the image on screen 53 must be viewed is preferably transparent or at least translucent. Each of screens 52 and 53 comprises a phosphor or other material which emits light when struck by an electron beam. The materials of targets 52 and 53 preferably emit visible light of two different primary colors. Tube 50 also comprises electron guns 54 and 55 which respectively emit beams 56 and 57. Beams 56 and 57 are respectively spaced between target screens 52 and 53 and curved deflection elements 58 and 59 which are respectively disposed spaced apart from and opposite each of screens 52 and 53. Guns 54 and 55 are provided with magnetic or electrostatic elements (not shown) to cause each of beams 56 and 57 to sweep across the target screen, spaced apart therefrom at a constant angle and to sweep in a series of planes each substantially perpendicular to the target screen. Horizontal lines in the raster on each screen are provided by sweeping the beam in the first manner while maintaining a suitable voltage on the associated deflection element, with suitable correction to provide straightness of the line in the raster. Vertical sweep of the raster is provided by changing the voltage on the deflection element and at the same time changing the angle of the beam in a plane perpendicular to the target screen. Tubes of this type are described in greater detail in a copending application.

Each vertical deflection element is preferably transparent conductive material coated on an interior surface of the tube envelope; element 59 on the side through which the image is viewed is necessarily transparent. Element 58, on the other side, may be opaque and may be metal if desired.

Tube 60 is provided having a flat planar target screen 61 disposed in a plane lying at an angle (for example 90°) to the plane of screens 51 and 52. Screen 61 is of a material which emits visible light, when struck with an electron beam, in a third primary color with respect to the colors emitted by screens 52 and 53. Tube 60 comprises deflection elements 62 spaced apart from and opposite screen 61, which is of conductive material and may be provided in a preferred manner by coating conductive material, which may be transparent or translucent, on an interior surface of the tube envelope. The tube further comprises electron gun 63 which emits a beam 64 spaced between screen 61 and deflection elements 62. Horizontal and vertical sweep to provide a raster on screen 61 is provided in the manner described in connection with tube 50.

Dichroic mirror 65 is provided at an angle (for example 45°) which bisects the angle between the planes of screen 61 and target plate 51 so that rays from targets 52 and 53 as indicated by arrows 66 and 67, pass directly therethrough and rays from screen 61 as indicated by arrow 68 are reflected by the mirror to travel from the mirror parallel to rays 66 and 67. Rays from the three target screens thus reach the eye 69 of a viewer, or a camera lens which may be substituted therefor, parallel to one another so that the images of screens 52, 53 and 61 are optically combined into an image comprising three colors. The image thus provided has the characteristics and advantages described above in connection with images of other embodiments.

Tube 60 may be substituted for tube 30 in FIGURE 2. Alternatively, tube 50 may be substituted for tube 10 in either of FIGURES 1, 2, 3 or 4 or for both of tubes 10 and 10' in FIGURE 4. If more suitable, elements 58 and 59 in tube 50 may be flat or nearly flat and may thus correspond more nearly to elements 62 in tube 60 or alternatively elements 62 in tube 60 may be curved to correspond more nearly to elements 58 and 59 in tube 50.

Referring now to FIGURE 6, an image in accordance with the invention may be provided by combining the images produced in three tubes which correspond to tube 30, namely tubes 30', 30'' and 30''', each being provided with a target screen, respectively 31', 31'' and 31'''. The screens emit visible light in three primary colors respectively when struck with electron beams. The images are combined with two dichroic mirrors 70 and 71 in the manner hereinbefore described for a simple mirror, to provide parallel rays 72, 73 and 74 which provide a single image which has the attributes hereinbefore described for other embodiments.

Tube 60 or a corresponding tube may be substituted for one or more of tubes 30', 30'' and 30'''.

The embodiments of FIGURES 2, 4 and 5 have the advantage of providing relatively compact devices, which occupy relatively little space, to accomplish the objectives of the invention.

It may thus be seen that the invention is broad in scope and includes such modifications as will be apparent to those skilled in the art and is to be limited only by the claims.

Having thus described our invention, we claim:

1. A device for providing a high definition television image comprising at least three colors, said device comprising a thin cathode ray tube comprising a thin transparent target plate and having a first target screen coated on one side of said transparent target plate and a second target screen coated on the opposite side of said transparent target plate, at least one vertical deflection element spaced apart from and opposite said first target screen and at least one second vertical deflection element spaced apart from and opposite said second target screen and two electron guns to provide a first beam and a second beam, said first beam disposed between said first target and said first element and said second beam disposed between said second target and said second element, each of said elements respectively adapted to cooperate with other means to provide impingement of said beams on said targets and to provide for vertical sweeping of said targets by said beams, so that the two images thus provided are substantially coincident in a single plane, means to provide a third image in a third color remote from said screens, and means to optically combine said third image with said first two to provide said third image effectively coincident in the same plane as said first two images.

2. The device of claim 1 comprising a thin cathode ray tube to provide said third image, said tube having a planar target screen and at least one vertical deflection element spaced apart from and opposite said target screen and an electron gun to provide a beam spaced between said screen and said element, said deflection element adapted to cooperate with other means to provide for vertical sweeping of said screen by said beam.

References Cited

UNITED STATES PATENTS

| | | | |
|---|---|---|---|
| 1,988,931 | 1/1935 | Alexanderson | 178—5.4 |
| 2,649,499 | 8/1953 | Barco et al. | 178—5.4 |
| 2,672,502 | 3/1954 | Albright | 178—5.4 |
| 2,795,731 | 6/1957 | Aiken | 313—81 XR |

ROBERT L. GRIFFIN, *Primary Examiner.*

R. MURRAY, *Assistant Examiner.*